No. 850,913. PATENTED APR. 23, 1907
T. A. EDISON.
SECONDARY BATTERY.
APPLICATION FILED DEC. 7, 1905.
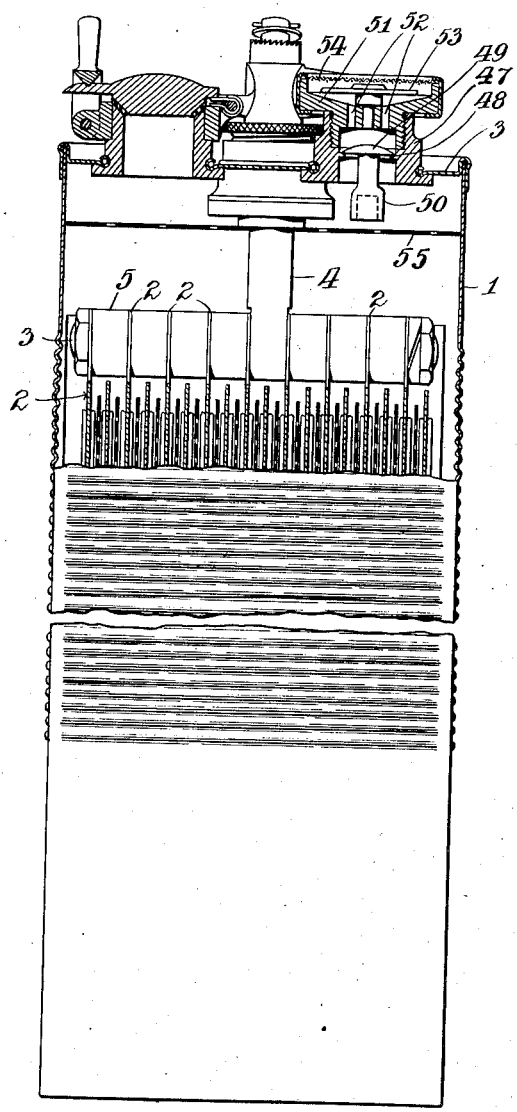
Attest:
Edgeworth Greene
Delos Holden
Inventor:
Thomas A. Edison
by Frank L. Dyer, Atty.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

SECONDARY BATTERY.

No. 850,913.     Specification of Letters Patent.     Patented April 23, 1907.

Original application filed November 28, 1902, Serial No. 133,112. Divided and this application filed December 7, 1905. Serial No. 290,713.

*To all whom it may concern:*

Be it known that I, THOMAS ALVA EDISON, a citizen of the United States, and a resident of Llewellyn Park, Orange, in the county of Essex and State of New Jersey, have invented a certain new and useful Improvement in Storage Batteries, of which the following is a description.

This application is a division of an application filed November 28, 1902, Serial No. 133,112.

My invention relates to improvements in storage batteries and has been designed more particularly for use in connection with storage batteries of the type invented by me wherein insoluble active materials are employed in an alkaline electrolyte; but it will be understood that the invention is applicable for use with storage batteries of other types.

My invention has for its object the provision of a relief-valve and gas-separator for permitting the escape of gas generated in the can and at the same time to separate therefrom any solution which may become mechanically entrained with such gases to prevent the escape thereof, while at the same time provision is made to prevent the explosion of any gases from outside sources.

Reference is hereby made to the accompanying drawing, which is a side elevation, partly in section, of a storage battery to which my invention is applied.

The can or receptacle 1 is generally rectangular, as shown, being formed, preferably, of thin sheet metal, which has been carefully nickel-plated, so as to prevent oxidation, particularly in an alkaline solution; but obviously other materials can be employed, if desired. Corresponding plates 2 of the battery are connected together and are mounted on bolts 3, passed through the eye of a proper conductor 4 for the external circuit, the plates being separated by washers 5 and held rigidly together by bolts 3.

In the operation of storage batteries employing either alkalin or acid electrolytes gases are generated, due ordinarily to overcharging, which results in the decomposition of water, and these gases are highly explosive. The gases as they leave the solution carry with them mechanically-entrained globules of the solution in the form of a very fine spray, which is objectionable, as it covers the battery and adjacent parts with a film of acid or alkaline sulution, as the case may be. Furthermore, the escaping gases when so charged with alkaline or acid globules are irritative to the mucous membrane of the nose and throat and are hence extremely unpleasant to persons who may be within their influence, and the loss of solution would in time render it necessary to replace that lost—an operation which is extremely desirable that the public should not be called upon to carry out. In the present invention I make provision for the escape of these gases which may be generated in objectionable quantity, while at the same time I effect the complete separation of any globules which may be mechanically entrained therewith, so that the gases are no longer noxious. I also provide for preventing the ignition of any gases within the cell from outside influences to thereby overcome the possibility of an explosion taking place. While these features of my invention have been designed particularly for use in connection with storage batteries of my improved type employing alkaline electrolytes, it will be understood, of course, that they may be employed in connection with other batteries wherein a generation of gases is effected either intentionally or accidentally—as, for instance, in the ordinary lead cell employing a sulfuric-acid solution. To these ends I secure in the top plate or cover 3 a neck 47, carrying a valve-seat 48, with which coöperates a small puppet or check valve 49, having a weighted stem 50, the valve being made, preferabl , of hard rubber. Screw-threaded into the neck 47 is a casing 51, having vent-openings 52 therein, and above said vent-openings I interpose a small dash-plate 53, which spreads and attenuates the escaping gases. The top of the casing 51 is provided with a gauze 54, which operates like the gauze of a safety-lamp to prevent the passage of the flame into the cell and the consequent ignition of any explosive gases therein. Such a contingency is further removed by the fact that the dash-plate 53 causes any gases which may escape from the cell to be diffused and diluted, so as to therefore burn with difficulty. If, for instance, the dash-plate 53 were not used, relatively narrow streams of gas would be permitted to issue from the vents 52 and pass through the gauze 54 in confined limits, and being thus relatively concentrated the gases would ignite, until finally the gauze would become so hot as to cause an explosion on its under side. When, however, the dash-plate 57 is used, the gases are so diffused and diluted that they cannot be ignited above the gauze under ordinary conditions of use. I find in practice that if the puppet-valve 49 or its equivalent is not employed the escaping gases, carrying with them a fine spray of the solution, deposit the liquid as a film over all the parts with which they come in contact and escape into the atmosphere still charged with solution. As the gases continue to escape from the cell and carry with them the mechanically-entrained globules the latter do not become absorbed by the already-deposited film, for the reason that the velocity of the escaping gases is not sufficient to overcome the surface tension of the latter and the globules rebound therefrom, and consequently the gases continue to carry with them the fine spray of liquid, however tortuous may be the course that they are compelled to follow. I find, however, that when the puppet-valve 49 is employed its weight prevents it from lifting until a definite gas-pressure has accumulated within the cell, and when this pressure is sufficient to lift the valve the latter is suddenly elevated, and a rush of the gases is thereby permitted. Being thus projected from the cell with relative rapidity, the escaping gases, carrying with them the fine spray of solution, are projected against the deposited film of the solution on the inside of the bore of the cap 51 at the edges of the valve with sufficient force to overcome the surface tension of the film to thereby cause the mechanically-entrained globules to coalesce with the film and be therefore effectively separated from the escaping gases. Consequently the escaping gases will be relieved of their objectionable character and will be no longer irritative. As soon as the rush of gas from the cell has taken place the weight of the puppet-valve closes the latter and keeps the cell sealed until sufficient gas-pressure has accumulated to cause these operations to be repeated.

Preferably I arrange a diaphragm 55, having perforations therein above the several plates, as shown. This diaphragm may be made of hard rubber of any desired thickness. I find that when a diaphragm is used overcharging of the cell causes the solution to froth, which rises until the diaphragm is reached, and the latter is coated with a film which closes all the perforations therein, thereby forming a gas-tight seal above the level of the electrolyte. As the gas-pressure is permitted to accumulate below the diaphragm the latter may be actually buckled upward until the pressure is sufficient to break through one or more of the perforations, allowing the escape of the gas with sufficient velocity to overcome the surface tension of the deposited film on the under side of the top of the cell and effecting thereby a separation of the mechanically-entrained globules from the escaping gases. Such a perforated diaphragm can be effectively used to supplement the operation of the check-valve separator before described, and particularly when a violent generation of gases is produced by overcharging; but it is preferably not relied upon entirely to effect a separation between the solution and the gases, for the reason that when gassing is effected slowly the gases pass through the perforations with so little velocity that a sepration of the globules is not secured.

Having now described my invention, what I claim as new, and desire to secure by Letters Patent, is as follows:

1. In a storage battery, the combination with a can and electrodes mounted therein, of an escape-tube in the top of said can, a valve in said tube, a casing carried by the escape-tube, and a dash-plate in said casing, substantially as set forth.

2. In a storage battery, the combination with a can and electrodes mounted therein, of a gas-vent in the can, a dash-plate, and a gauze-like or perforated diaphragm arranged in the escape-vent and through which the escaping gases pass, for the purpose, substantially as set forth.

3. In a storage battery, the combination with a can and electrodes mounted therein, of an escape-tube in the top of said can, a valve in said tube, a casing carried by the escape-tube, and a gauze diaphragm for said casing, substantially as set forth.

This specification signed and witnessed this 6th day of December, 1905.

THOS. A. EDISON.

Witnesses:
FRANK L. DYER,
ANNA R. KLEHM.